(12) United States Patent
Tsao

(10) Patent No.: US 6,421,546 B1
(45) Date of Patent: Jul. 16, 2002

(54) SIGNAL TRANSMISSION CIRCUIT OF A WIRELESS TELEPHONE HANDSET

(75) Inventor: Kuan-Liang Tsao, Yong-Ho (TW)

(73) Assignee: Acer Peripherals, Inc., Taoyuan (TW)

(*) Notice: Subject to any disclaimer, the term of this patent is extended or adjusted under 35 U.S.C. 154(b) by 0 days.

(21) Appl. No.: 09/506,390

(22) Filed: Feb. 18, 2000

(30) Foreign Application Priority Data

Mar. 4, 1999 (TW) ........................................ 88103336 A

(51) Int. Cl.⁷ ................................................ H04B 1/38
(52) U.S. Cl. ........................ 455/574; 455/127; 455/88; 455/343
(58) Field of Search ................................ 455/127, 574, 455/68, 88, 89, 343, 126, 550, 575, 572, 90, 95, 116; 330/51, 285; 325/18; 360/62; 379/58

(56) References Cited

U.S. PATENT DOCUMENTS

| | | | | |
|---|---|---|---|---|
| 3,988,675 A | * | 10/1976 | Dykas | 455/78 |
| 4,639,795 A | * | 1/1987 | Watanabe | 360/62 |
| 4,852,147 A | * | 7/1989 | Suzuki | 379/58 |
| 5,095,541 A | * | 3/1992 | Aisaka | 455/89 |
| 5,182,527 A | * | 1/1993 | Nakanishi | 330/285 |
| 5,203,020 A | * | 4/1993 | Sato | 455/68 |
| 5,511,234 A | * | 4/1996 | Ha | 455/127 |
| 5,551,067 A | * | 8/1996 | Hulkko | 455/88 |
| 5,640,693 A | * | 6/1997 | Balch | 455/127 |
| 5,661,434 A | * | 8/1997 | Brozovich | 330/51 |
| 5,909,643 A | * | 6/1999 | Aihara | 455/127 |
| 5,999,830 A | * | 12/1999 | Taniguchi | 455/574 |
| 6,112,061 A | * | 8/2000 | Rapeli | 455/83 |
| 6,118,989 A | * | 9/2000 | Abe | 455/127 |
| 6,233,438 B1 | * | 5/2001 | Wynn | 455/126 |

* cited by examiner

Primary Examiner—Vivian Chang
Assistant Examiner—John J Lee

(57) ABSTRACT

The invention relates to a signal transmission circuit of a wireless telephone handset for reducing power consumption. The signal transmission circuit comprises a voice transformation circuit for transforming a user's voice into a voice signal, a voice modulator electrically connected to the voice transformation circuit for modulating the voice signal and transforming it into a radio frequency signal, a power amplifier electrically connected to the voice modulator for amplifying the radio frequency signal, a first switch electrically connected to the power amplifier for turning the power amplifier on and off, an antenna for transmitting the radio frequency signal outputted from the power amplifier, and a control circuit for controlling operations of the telephone handset. When the telephone handset is transmitting the radio frequency signal using the antenna, the control circuit turns on the power amplifier by using the first switch so that the radio frequency signal generated by the voice modulator can be amplified by the power amplifier before being transmitted through the antenna. When the telephone handset is receiving a radio frequency signal, the control circuit turns off the power amplifier by using the first switch to reduce power consumption.

8 Claims, 2 Drawing Sheets

SIGNAL TRANSMISSION CIRCUIT OF A WIRELESS TELEPHONE HANDSET

BACKGROUND OF THE INVENTION

1. Field of the Invention

The invention relates to a signal transmission circuit of a wireless telephone handset, and more particularly, to a signal transmission circuit of a wireless telephone handset for reducing power consumption.

2. Description of the Prior Art

A battery is typically used to supply power to a wireless telephone handset. Unfortunately, there are certain problems associated with using batteries. First of all, batteries may weigh down the telephone handset if they are not made light and compact. Also, the power supplied by a battery is often limited. Another consideration is the sensitivity of the handset. Reducing handset power consumption and increasing handset sensitivity has become the recent focus of handset design.

Please refer to FIG. 1. FIG. 1 is a perspective diagram of a prior art signal transmission circuit 10. The signal transmission circuit 10 is used in a wireless telephone handset. The signal transmission circuit 10 comprises a voice transformation circuit 12 for transforming a user's voice into a voice signal, a voice modulator 14 electrically connected to the voice transformation circuit 12 for modulating the voice signal and transforming it into a radio frequency signal, a power amplifier 16 electrically connected to the voice modulator 14 for amplifying the radio frequency signal, an electric source 22 electrically connected to the power amplifier 16 for supplying power to the power amplifier 16, an antenna 20 for transmitting the radio frequency signal outputted from the power amplifier 16, and a matching circuit 18 electrically connected between the power amplifier 16 and antenna 20 for matching the impedance of the power amplifier 16 and antenna 20.

When the handset is outputting or receiving signals, the power amplifier 16 is always switched on. When the handset is outputting the user's voice signals, the power amplifier 16 amplifies the radio frequency signal generated by the voice modulator 14, and the radio frequency signal is outputted through the antenna 20. When the handset is receiving signals, the power amplifier 16 is still switched on so as to consume power. Because the electric source 22 continuously supplies power enabling the power amplifier 16 to remain on, the power is easily consumed. This shortens the life span of the battery of the handset. Also, in the prior art signal transmission circuit 10, w hen the handset is changed from outputting signals to receiving signals, timing error may occur which causes undesired signals to be amplified by the power amplifier 16 and leads to unnecessary power consumption of the handset. Finally, received signals may not be properly detected so the sensitivity of the handset will be reduced.

SUMMARY OF THE INVENTION

It is therefore a primary objective of the present invention to provide a signal transmission circuit of a wireless telephone handset for reducing power consumption and improving the sensitivity of the handset.

Briefly, in a preferred embodiment, the present invention provides a signal transmission circuit of a wireless telephone handset comprising:

- a voice transformation circuit for transforming a user's voice into a voice signal;
- a voice modulator electrically connected to the voice transformation circuit for modulating the voice signal and transforming it into a radio frequency signal;
- a power amplifier electrically connected to the voice modulator for amplifying the radio frequency signal;
- a first switch electrically connected to the power amplifier for turning the power amplifier on and off;
- an antenna for transmitting the radio frequency signal outputted from the power amplifier; and
- a control circuit for controlling operations of the telephone handset;

wherein when the telephone handset is transmitting the radio frequency signal using the antenna, the control circuit turns on the power amplifier by using the first switch so that the radio frequency signal generated by the voice modulator can be amplified by the power amplifier and then be transmitted through the antenna, and when the telephone handset is receiving a radio frequency signal, the control circuit turns off the power amplifier by using the first switch to reduce power consumption.

It is an advantage of the present invention that when the handset is receiving a radio frequency signal, the control circuit uses the first switch to turn off the power amplifier and the second switch to prevent interference. Therefore, the power consumption of the handset using the signal transmission circuit is reduced and the sensitivity of the handset is enhanced.

These and other objects and the advantages of the present invention will no doubt become obvious to those of ordinary skill in the art after having read the following detailed description of the preferred embodiment that is illustrated in the various figures and drawings.

DETAILED DESCRIPTION OF THE PREFERRED EMBODIMENT

Figure 1:
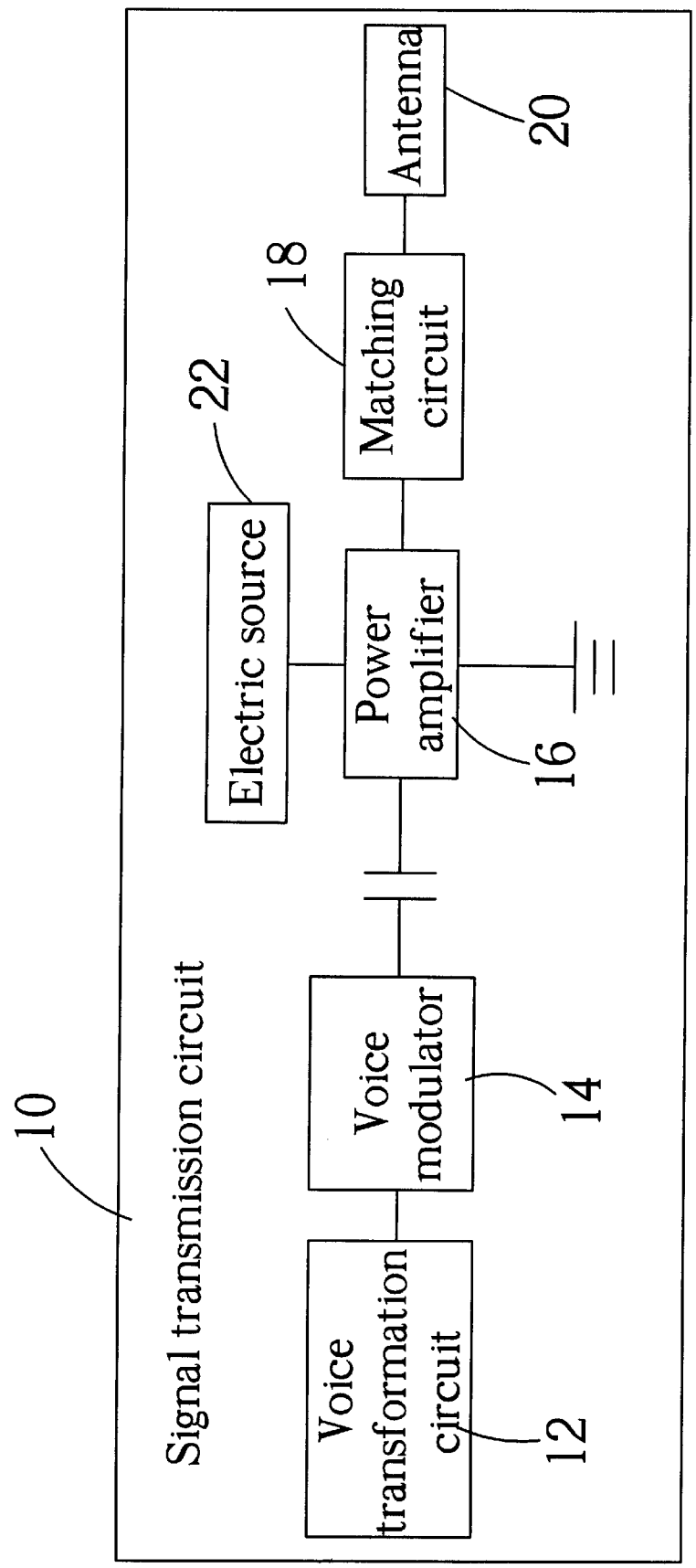
FIG. 1 is a perspective diagram of a prior art signal transmission circuit.
Figure 2:
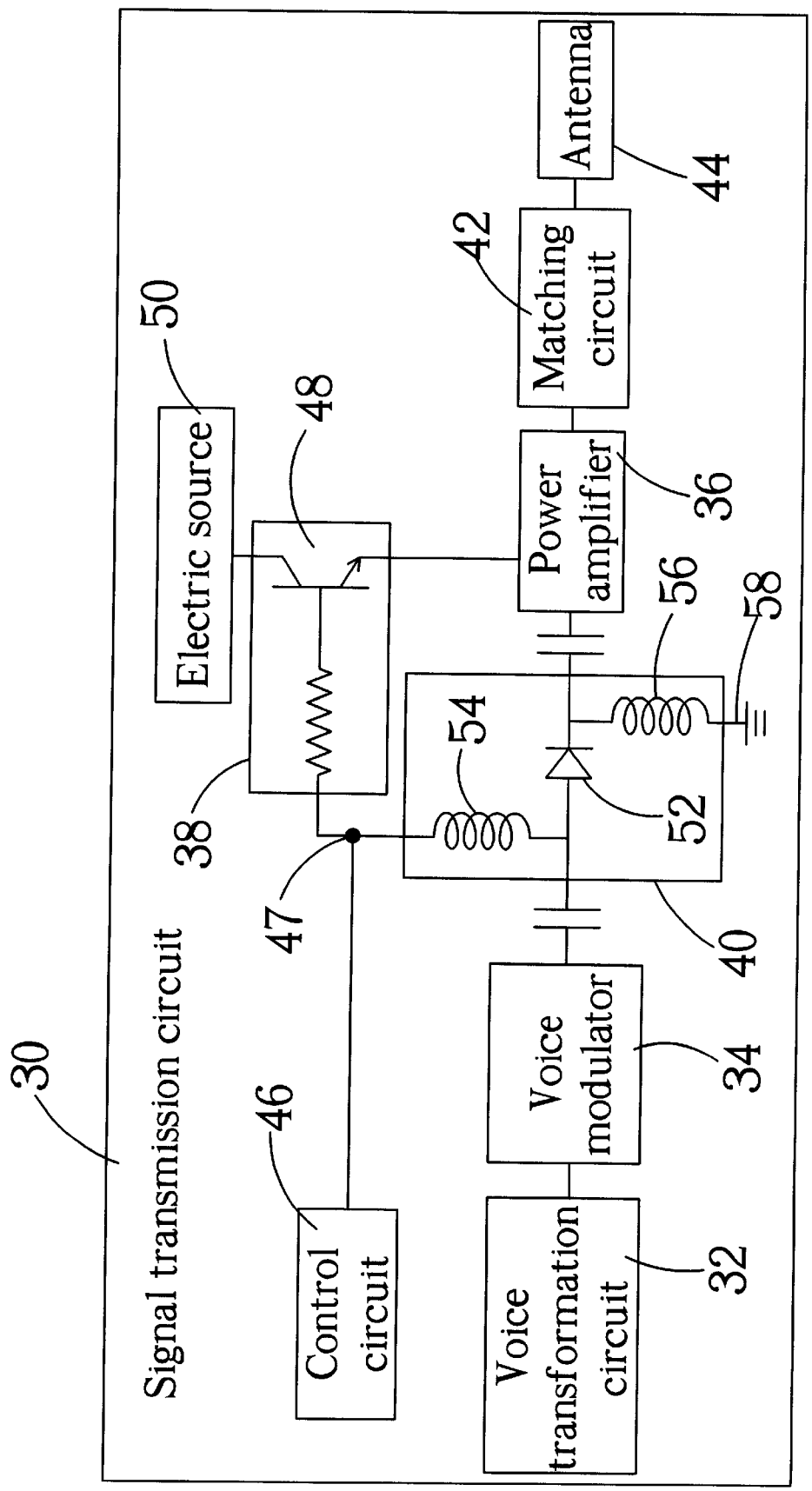
FIG. 2 is a perspective diagram of a signal transmission circuit according to the present invention.

Please refer to FIG. 2. FIG. 2 is a perspective diagram of signal transmission circuit 30 according to the present invention. The signal transmission circuit 30 is used in a wireless telephone handset. The signal transmission circuit 30 comprises a voice transformation circuit 32 for transforming a user's voice into a voice signal, a voice modulator 34 electrically connected to the voice transformation circuit 32 for modulating the voice signal and transforming it into a radio frequency signal, a power amplifier 36 electrically connected to the voice modulator 34 for amplifying the radio frequency signal, a first switch 38 electrically connected to the power amplifier 36 for turning the power amplifier 36 on and off, a second switch 40 electrically connected between the voice modulator 34 and power amplifier 36 for controlling the transmission of the radio frequency signal, an antenna 44 for transmitting the radio frequency signal outputted from the power amplifier 36, a matching circuit 42 electrically connected between the power amplifier 36 and antenna 44 for matching the impedance of the power amplifier 36 and antenna 44, and a control circuit 46 for controlling operations of the telephone handset.

When the telephone handset is transmitting the radio frequency signal using the antenna 44, the control circuit 46 turns on the power amplifier 36 by using the first switch 38 so that the radio frequency signal generated by the voice modulator 34 can be amplified by the power amplifier 36 and then be transmitted through the antenna 44. When the telephone handset is receiving a radio frequency signal, the control circuit 46 turns off the power amplifier 36 by using the first switch 38 to reduce power consumption and the control circuit 46 turns off the second switch 40 to prevent the radio frequency signal generated by the voice modulator 34 from being transmitted into the power amplifier 36. The first switch 38 comprises a bipolar junction transistor 48 controlled by the control circuit 46 and is electrically connected between an electric source 50 and the power amplifier 36 for controlling the electric power supplied to the power amplifier 36. The second switch 40 comprises a PIN diode 52 electrically connected between an output end of the voice modulator 34 and an input end of the power amplifier 36 for controlling the transmission of the radio frequency signal, a first radio frequency choke 54 electrically connected between a control end 47 of the control circuit 46 and the input end of the PIN diode 52 for preventing the radio frequency signal outputted from the voice modulator 34 from being transmitted into the control circuit 46, and a second radio frequency choke 56 electrically connected between the output of the PIN diode 52 and a ground line 58.

When the handset is transmitting the user's voice signals, the control circuit 46 will make the voltage of the control end 47 of the control circuit 46 exceed a predetermined voltage level to switch on the bipolar junction transistor 48 and PIN diode 52. Then, the first switch 38 is used to turn on the power amplifier 36, and the second switch 40 is switched on for transmitting the radio frequency signal outputted from the voice modulator 34 into the power amplifier 36. Then, the radio frequency signal amplified by the power amplifier 36 is outputted through the antenna 44. When the telephone handset is receiving a radio frequency signal, the control circuit 46 will make the voltage of the control end 47 of the control circuit 46 lower than the predetermined voltage level. This causes the bipolar junction transistor 48 and PIN diode 52 to switch off. The first switch 38 is then used to turn off the power amplifier 36 for reducing power consumption, and the second switch 40 is switched off for preventing the radio frequency signal outputted from the voice modulator 34 from being transmitted into the power amplifier 36.

Because the first switch 38 is used for switching on or off the power amplifier 36 and the power amplifier 36 is switched off when the handset is receiving a radio frequency signal, the power consumption of the handset is reduced. Also, the second switch 40 is used for controlling whether the radio frequency signal outputted from the voice modulator 34 is transmitted into the power amplifier 36 or not. The radio frequency signal is prevented from being transmitted into the power amplifier 36 when the handset receives a radio frequency signal. Thus, the power consumption of the handset is reduced, and the sensitivity of the handset is enhanced.

Compared with the prior art signal transmission circuit 10, the signal transmission circuit 30 according to the present invention has a first switch 38 for switching on or off the power amplifier 36, and a second switch 40 for controlling whether the radio frequency signal outputted from the voice modulator 34 is transmitted into the power amplifier 36 or not. When the handset is receiving a radio frequency signal, the control circuit 46 will use the first switch 38 to switch off the power amplifier 36 and the second switch 40 to avoid interference. Therefore, the power consumption of the handset using the signal transmission circuit 30 is reduced, and the sensitivity of the handset is enhanced.

Those skilled in the art will readily observe that numerous modifications and alterations of the propeller may be made while retaining the teachings of the invention. Accordingly, the above disclosure should be construed as limited only by the metes and bounds of the appended claims.

What is claimed is:

1. A signal transmission circuit of a wireless telephone handset comprising:

a voice transformation circuit for transforming a user's voice into a voice signal;

a voice modulator electrically connected to the voice transformation circuit for modulating the voice signal and transforming it into a radio frequency signal;

a power amplifier electrically connected to the voice modulator for amplifying the radio frequency signal;

a first switch electrically connected to the power amplifier for turning the power amplifier on and off;

a second switch electrically connected between the voice modulator and power amplifier for controlling the transmission of the radio frequency signal;

an antenna for transmitting the radio frequency signal outputted from the power amplifier; and a control circuit for controlling operations of the telephone handset;

wherein when the telephone handset is transmitting the radio frequency signal using the antenna, the control circuit turns on the first switch and the second switch so that the radio frequency signal generated by the voice modulator can be amplified by the power amplifier and then betransmitted through the antenna, and when the telephone handset is receiving a radio frequency signal, the control circuit turns off the first switch and the second switch to reduce power consumption and prevent the radio frequency signal generated by the voice modulator from being transmitted into the power amplifier.

2. The signal transmission circuit of claim 1 wherein the first switch comprises a bipolar junction transistor controlled by the control circuit and electrically connected between an electric source and the power amplifier for controlling the electric power supplied to the power amplifier.

3. The signal transmission circuit of claim 1 wherein the second switch comprises:

a PIN diode electrically connected between an output end of the voice modulator and an input end of the power amplifier for controlling the transmission of the radio frequency signal;

a first radio frequency choke electrically connected between a control end of the control circuit and the input end of the PIN diode for preventing the radio frequency signal outputted from the voice modulator from being transmitted into the control circuit; and a second radio frequency choke electrically connected between the output of the PIN diode and ground;

wherein when the voltage of the control end of the control circuit exceeds a predetermined voltage level, the PIN diode is switched on to transmit the radio frequency signal outputted from the voice modulator into the power amplifier, and when the voltage of the control end of the control circuit is lower than the predetermined voltage level, the PIN diode is switched off to prevent the radio frequency signal generated by the voice modulator from being transmitted into the power amplifier.

4. A signal transmission circuit of a communications apparatus comprising:

a modulator for generating a radio frequency signal;

a power amplifier electrically connected to the modulator for amplifying the radio frequency signal;

a second switch electrically connected between the modulator and power amplifier for controlling the transmission of the radio frequency signal;

an antenna for transmitting the radio frequency signal outputted from the power amplifier; and a control circuit for controlling operations of the communications apparatus;

wherein when the communications apparatus is transmitting the radio frequency signal using the antenna, the control circuit turns on the second switch so that the radio frequency signal generated by the modulator can be transmitted through the antenna, and when the communications apparatus is receiving a radio frequency signal, the control circuit turns off the second switch to prevent the radio frequency signal generated by the modulator from being transmitted into the power amplifier.

5. The signal transmission circuit of claim 4 wherein the second switch comprises:

a PIN diode electrically connected between an output end of the modulator and an input end of the power amplifier for controlling the transmission of the radio frequency signal;

wherein when the voltage of the control end of the control circuit exceeds a predetermined voltage level, the PIN diode is switched on to transmit the radio frequency signal outputted from the modulator into the power amplifier, and when the voltage of the control end of the control circuit is lower than the predetermined voltage level, the PIN diode is switched off to prevent the radio frequency signal generated by the modulator from being transmitted into the power amplifier.

6. The signal transmission circuit of claim 5 wherein the second switch further comprises:

a first radio frequency choke electrically connected between a control end of the control circuit and the input end of the PIN diode for preventing the radio frequency signal outputted from the modulator from being transmitted into the control circuit; and a second radio frequency choke electrically connected between the output of the PIN diode and ground.

7. The signal transmission circuit of claim 4 further comprising a first switch electrically connected to the power amplifier for turning the power amplifier on and off, wherein when the communications apparatus is transmitting the radio frequency signal using the antenna, the control circuit turns on the first switch and the second switch so that the radio frequency signal generated by the modulator can be amplified by the power amplifier and then be transmitted through the antenna, and when the communications apparatus is receiving a radio frequency signal, the control circuit turns off the first switch and the second switch to reduce power consumption and prevent the radio frequency signal generated by the modulator from being transmitted into the power amplifier.

8. The signal transmission circuit of claim 7 wherein the first switch comprises a bipolar junction transistor controlled by the control circuit and electrically connected between an electric source and the power amplifier for controlling the electric power supplied to the power amplifier.

* * * * *